United States Patent [19]
van der Lely

[11] 4,058,171
[45] Nov. 15, 1977

[54] MOUNTING OF SOIL WORKING TINES

[76] Inventor: Cornelis van der Lely, 7, Bruschenrain, Zug, Switzerland

[21] Appl. No.: 545,006

[22] Filed: Jan. 29, 1975

[30] Foreign Application Priority Data

Jan. 31, 1974  Netherlands .......................... 7401323
Feb. 8, 1974  Netherlands .......................... 7401726

[51] Int. Cl.² .................. A01B 23/02; A01B 33/06
[52] U.S. Cl. .................... 172/713; 172/59; 172/747; 172/773; 172/762; 172/526
[58] Field of Search ............... 172/59, 49, 773, 112, 172/747, 526, 713, 681, 762, 111, 749, 746

[56] References Cited

U.S. PATENT DOCUMENTS

| | | |
|---|---|---|
| 3,616,862 | 11/1971 | van der Lely ................. 172/49 X |
| 3,774,687 | 11/1973 | van der Lely ................... 172/49 |
| 3,774,689 | 11/1973 | van der Lely .................. 172/112 |
| 3,821,989 | 7/1974 | van der Lely et al. ............ 172/59 |
| 3,902,560 | 9/1975 | van der Lely ................... 172/59 |
| 3,920,077 | 11/1975 | van der Lely ................ 172/112 X |
| D. 237,526 | 11/1975 | van der Lely ................ 172/773 X |

Primary Examiner—George J. Marlo
Attorney, Agent, or Firm—Mason, Mason & Albright

[57] ABSTRACT

A tine mounting for a rotary harrow has an elongated support and a holder at each outer support end. Each holder has a configured vertical bore that tightly receives the fastening portion of a tine and a central bore that receives a rotary shaft. The mounting is preferably made of a single piece of forged or cast material with the forward side of each holder having an integral screen and a majority of the mass of the material. The support can have an inclined portion that projects from each side of the central bore. The vertical bores can taper upwardly and be multi-sided to conform to a tine fastening portion.

15 Claims, 17 Drawing Figures

FIG. 1

MOUNTING OF SOIL WORKING TINES

This invention relates to the mounting of soil working tines in rotary harrows such as those which comprise a plurality of soil working members that are rotatable about corresponding vertical or substantially vertical axes, the tine mountings being of the kind comprising a bore for connecting the mounting to a shaft affording the axis of rotation of a corresponding soil working member and at least one bore for receiving the fastening portion of a tine, said bores being in nonaligned spaced relationship.

According to one aspect of the invention, there is provided a tine mounting of the kind set forth, wherein the mounting is forged or cast from a single piece of material which integrally defines said bores, a majority of the mass of said material being at the front of the mounting with respect to the intended direction of operative rotation of the corresponding soil working member.

For a better understanding of the invention, and to show how to the same may be carried into effect, reference will now be made, by way of example, to the accompanying drawings, in which.

Figure 1:
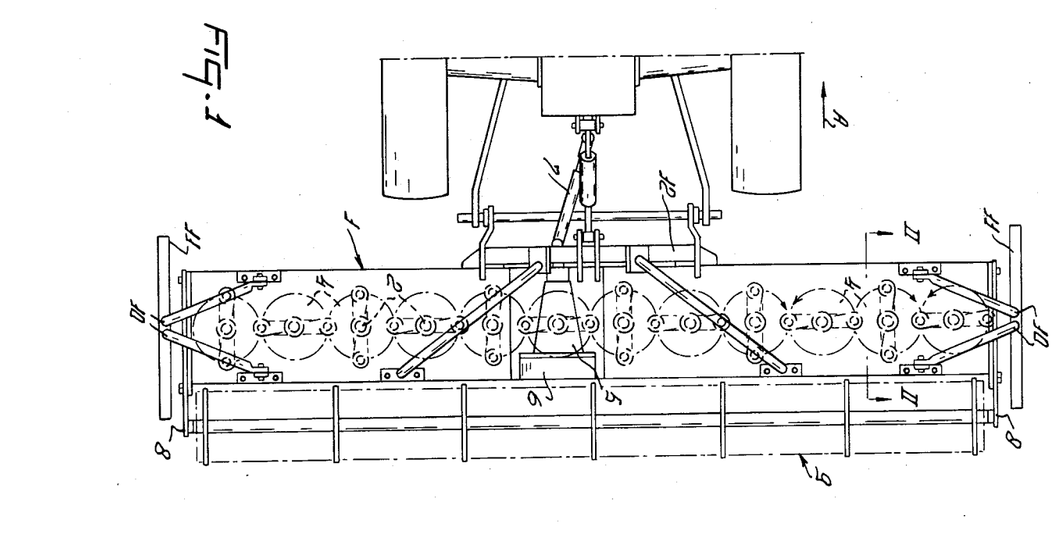
FIG. 1 is a plan view of a rotary harrow having tine mountings in accordance with the invention, the harrow being connected to the rear of an agricultural tractor.

Referring to the drawings, and particularly to FIG. 1 thereof, the invention is illustrated in its application to a rotary harrow which could also be considered as being a soil cultivating implement or cultivator. The rotary harrow has a hollow box-shaped frame portion 1 (FIGS. 1 and 2) that extends substantially horizontally transverse, and normally substantially horizontally perpendicular, to the intended direction of operative travel of the harrow which is indicated in FIG. 1 by an arrow A. A plurality (in this case, twelve) of vertical or substantially vertical shafts 2 are rotatably mounted in upper and lower bearings of the frame portion 1 and lie in a single row in regularly spaced apart relationship. The distance between the longitudinal axes of two immediately neighbouring shafts 2 should not be greater than 30 centimeters and is preferably, but not essentially, substantially 25 centimeters. The lowermost end of each shaft 2 that projects beneath the bottom of the hollow frame portion 1 carries a corresponding tined soil working member that is generally indicated by the reference 3. Each shaft 2 is provided, inside the hollow frame portion 1, with a corresponding straight- or spur-toothed pinion 4, the twelve pinions 4 being of such a size, and being arranged in such a way, that the teeth of each pinion 4 are in mesh with those of the immediately neighbouring pinion 4, or each of the immediately neighbouring pinions 4, in the single row thereof. One of the shafts 2 that corresponds to the central pair of soil working members 3 in the row thereof has an upward extension into a gear box 5 and bevel pinions and shafts within that gear box 5 place said shaft extension in driven connection with a rotary input shaft of the gear box 5 through the intermediary of a change-speed gear 6 mounted at the back of the gear box. The change-speed gear comprises a plurality of interchangeable and/or exchangeable pinions of which a pair can be selected to enable a corresponding transmission ratio between shafts in the gear box 5 to be employed thus enabling the shafts 2 to be rotated at different speeds in response to an unchanged speed of rotation applied to the rotary input shaft of the gear box 5. The rotary input shaft that has just been mentioned has a splined or otherwise keyed end that projects forwardly from said gear box in substantially the direction A and that end is arranged to be placed in driven connection with the power take-off shaft of an operating tractor or other vehicle by way of an intermediate telescopic transmission shaft 7, which is of a construction that is known per se, having universal joints at its opposite ends.

Two arms 8 are turnable upwardly and downwardly alongside the opposite lateral sides or ends of the hollow frame portion 1 about substantially horizontally aligned pivots located in an upper and leading, with respect to the direction A, region of the frame portion 1. Means that are not shown in detail in the accompanying drawings are provided to enable the arms 8 to be secured in chosen angular settings about the aligned axes of the pivots which have just been mentioned and rearmost end regions of the arms 8 that are inclined downwardly towards the ground behind the frame portion 1 carry the opposite ends of a rototable supporting member in the form of a ground roller 9. The ground roller 9 extends substantially throughout the whole of the working width of the harrow and is of an open, rather than closed, substantially right circular cylindrical formation. The angular settings of the arms 8 about their pivotal connections to the hollow frame portion 1 that are chosen determine the level of the axis of rotation of the ground roller 9 relative to the remainder of the harrow and this, it will be realised, is a principal factor in determining the working level of the harrow and thus the depths by which the tines of its soil working members 3 can penetrate into the ground.

Arms 10 are turnable about substantially horizontally aligned pivots mounted on top of the frame portion 1 so as to define axes that are substantially parallel to the direction A. The arms 10 extend from their pivot mountings over the opposite lateral sides or ends of the frame portion 1 and there carry upright shield plates 11 whose lowermost edges bear against the ground surface during the operation of the harrow and can slide over that surface in the direction A. The shield plates 11 extend substantially parallel to the direction A and can turn upwardly and downwardly about the pivotal mountings of the arms 10 to match undulations in the surface of the ground that may be met with during passage over the soil. The shield plates 11 cooperate with the soil working members 3 at the opposite ends of the row of those members and minimise ridging of the soil at the opposite edges of the strip of ground that is worked by the members 3 during the operation of the harrow. The shield plates 11 also prevent stones and other potentially dangerous objects from being flung sideways from the harrow by the rapidly moving tines of its soil working members 3 and thus greatly reduce the likelihood of injury to persons in the vicinity and the likelihood of damage to property. The front of the frame portion 1 with respect to the direction A is provided with a coupling member or trestle 12 of generally triangular configuration which coupling member or trestle can be employed in the manner that can be seen in outline in FIG. 1 of the drawings in connecting the harrow to the three-point lifting device or hitch at the rear of an agricultural tractor or other operating vehicle.

Each soil working member 3 comprises a substantially horizontal tine support 13 that is disposed substantially perpendicular to the longitudinal axis of the corresponding shaft 2 by the lowermost end of which it is carried. The connection of each shaft 2 to the corresponding tine support 13 is located midway along the length of the latter and it will be seen from FIG. 2, in particular, that the opposite ends of each tine support 13 define two tine holders 14 in which fastening portions 15 of rigid soil working tines 16 are firmly, but releasably, secured. The mountings of each of the twelve pairs of tines 16 are all identical and, accordingly, it is only necessary to describe the mounting of one pair of tines 16 that correspond to a single soil working member 3 in detail. The tine support 13 and its two tine holders 14 are forged from a single piece of metallic material and the longitudinal axes of the two holders 14 are disposed substantially parallel to the axis of the corresponding shaft 2 and are thus normally vertical or substantially vertical during the use of the harrow. Each holder 14 is of substantially right circular cylindrical external configuration although, as will be evident from FIG. 2, in particular, of the drawings, the material of the wall of each holder 14 is somewhat thicker at the side of the holder which is furthest from the corresponding shaft 2 in a region midway between the top and bottom of the holder than it is at and near the top and bottom. The internal bore of each holder 14 that receives the corresponding tine fastening portion 15 is of upwardly tapering frusto conical configuration (see FIGS. 2 and 4 of the drawings).

The front of each holder 14 with respect to the intended direction of rotation of the corresponding soil working member 3 (see the arrow at the top of FIG. 3 of the drawings) is provided with an integral screen 15A, said screen joining both the holder 14 itself and the neighbouring portion of the tine support 13 that is integral with the holder 14. The integrally forged screen 15A is steeply inclined upwards, and forwardly with respect to the direction of rotation which has just been mentioned, from its junction with the holder 14 and support 13 in the manner which can be seen best in FIG. 4 of the drawings. The provision of the screens 15A also means that there is more of the material from which the support 13, holders 14 and screens 15A are integrally made at the front of each support 13 and holder 14 with respect to the intended direction of rotation of the corresponding soil working member 3 than there is at the rear thereof with respect to the same direction. This arrangement increases the rigidity of the whole integral assembly which is, of course, desirable to avoid or reduce damage when stones or other hard objects in the soil are met with during operation. A central region of the tine support 13 is formed as a boss 16A having an internally splined bore. The splines 17 in said bore cooperate with external splines at the lowermost end of the corresponding shaft 2 and ensure that the soil working member 3 will be rigid in rotation with its shaft 2 at all times. A short screwthreaded portion is provided beneath the splined portion of each shaft 2 and a nut 18 and washer co-operate with each such screwthreaded portion to maintain the corresponding boss 16A axially in position on the shaft 2. A split pin or the like is used to prevent the loosening of each nut 18.

The top and bottom of the boss 16A are both flat and both project slightly beyond the corresponding surface of the tine support 13. The flat top and bottom are both substantially perpendicular to the longitudinal axis of the shaft 2, the bottom constituting a stop for co-operation with the corresponding nut 18 preferably, although not essentially, through the intermediary of a washer as mentioned above. The top of the boss 16A is of greater diameter than the bottom thereof and affords a screen for the lower bearing of the corresponding shaft 2 when the boss 16A is in its intended operative position.

Figures 2, 3, 4:
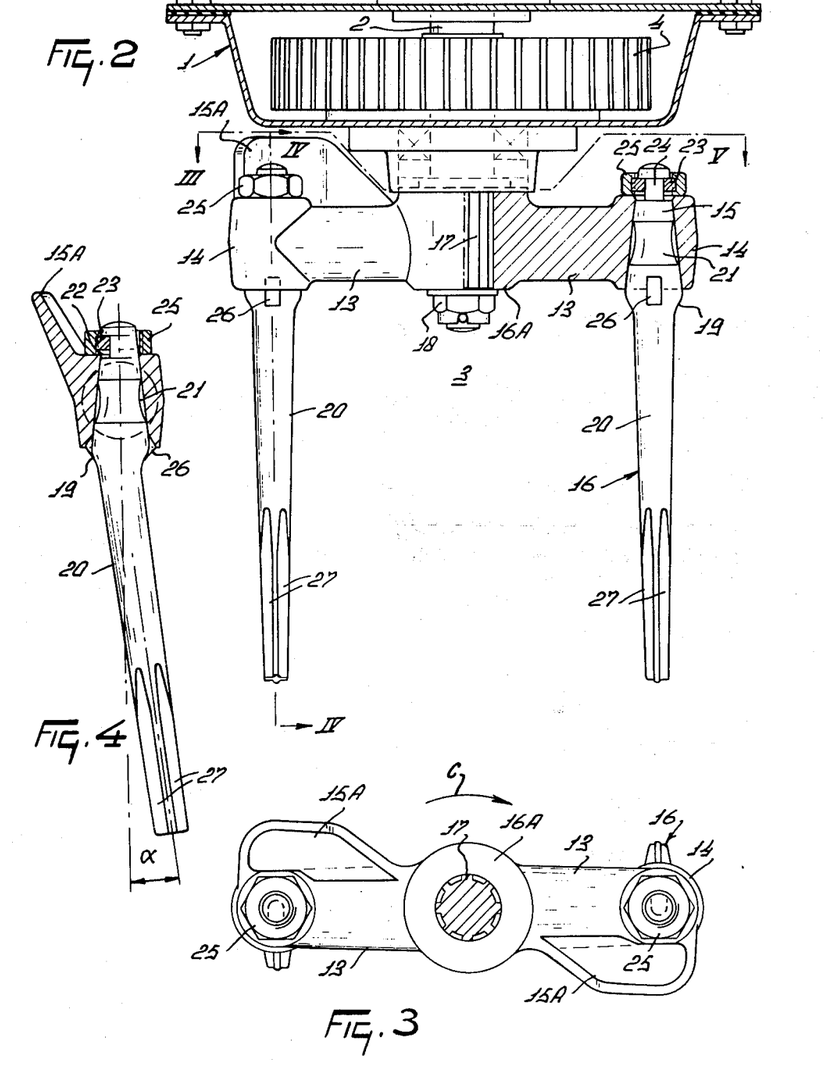
FIG. 2 is a section, to an enlarged scale, taken on the line II—II in FIG. 1.
FIG. 3 is a section taken on the line III—III in FIG. 2.
FIG. 4 is a section taken on the line IV—IV in FIG. 2.

In addition to the fastening portion 15 of each tine 16 that is arranged in a corresponding one of the holders 14 when the tine is in use, each tine 16 also comprises a lower active or soil working portion 20 that is integrally connected to the fastening portion 15 by way of a short downwardly tapering portion or neck 19. As can be seen in FIG. 4 of the drawings, the longitudinal axis of the tine fastening portion 15 is inclined to the longitudinal axis of the straight active or soil working portion 20 by an angle $\alpha$ which conveniently has a magnitude of substantially 8° and which should preferably not be less than that magnitude. The fastening portion 15 is of upwardly tapering configuration, to match the upward taper of the bore of the holder 14 with which it co-operates but it is formed substantially midway along its upright length with a shallow circumscribing groove 21. Close to its uppermost end, the fastening portion 15 is formed with a recess 22 that is of substantially U-shaped configuration when viewed lengthwise of the longitudinal axis of the portion 15. The top and bottom walls of the recess 22 are both substantially perpendicular to the longitudinal axis of the fastening portion 15. A separate retaining element 23 is arranged to be entered in the recess 22 and is shaped to fit that recess. In particular, the retaining element 23 is shaped to fit around a part 24 of the fastening portion 15 that comprises the material of said portion 15 that is not omitted by the formation of the recess 22 itself. The external curved surface of the retaining element 23 is formed with a screwthread which surrounds the longitudinal axis of the fastening portion 15 to a large extent, although not completely. The outer surface of the retaining element 23 upon which the screwthread is formed is of right circular cylindrical configuration and projects slightly beyond the frusto conical surface of the fastening portion 15 including the part 24 thereof that has just been mentioned. A nut 25 co-operates with the screwthreaded surface of the retaining element 23 and, when tightened, bears against the top of the corresponding holder 14 to draw the tine fastening portion 15 upwardly into tight engagement with the internal bore of that holder. Tightening of the nut 25 moves the retaining element 23 upwardly into contact with the upper surface or wall of the recess 22 and thus, when the condition that is best illustrated in FIG. 4 of the drawings is reached, the fastening portion 15 is firmly located in its holder 14 in a condition of tension.

When in its appointed position in one of the holders 14, each tine fastening portion 15 bears against the wall of that holder 14 by two spaced regions, that is to say, the region above the groove 21 and the region below the groove 21. Diametrically opposed notches are formed integrally of each holder 14 at the lower end thereof and, when the corresponding tine 16 is in its operative position, diametrically opposed lugs 26 at the bottom of the fastening portion 15 thereof are entered in said notches thus preventing the tine 16 from turning about the longitudinal axis of its fastening portion 15 in the co-operating holder 14. It will be noted that, under the assembled conditions which have just been described, most of the recess 22 in the fastening portion 15 is located above the level of the top of the corresponding holder 14.

FIGS. 5 to 16 of the drawings illustrate an embodiment in which the soil working members 3 are replaced by soil working members 26A which each comprise a tine mounting, generally indicated by the reference 27, carried by the lowermost end of a corresponding one of the shafts 2 that projects beneath the frame portion 1. The parts of the tine mounting 27 are made integrally from a single piece of metallic material by forging, said mounting 27 comprising a central boss 28 of substantially right circular cylindrical configuration, said boss 28 being formed with an internal axially extending bore 29. The internal wall of the bore 29 carries a plurality of splines 30 that extend throughout the length of that bore, the splines 30 being arranged to co-operate with external splines at the lowermost end of the corresponding shaft 2 to ensure that the soil working member 26A will be rigid in rotation with its shaft 2 at all times. A short screwthreaded portion is provided beneath the splined portion of each shaft 2 and a nut 31 and washer co-operate with each such screwthreaded portion to maintain the corresponding boss 28 axially in position on the shaft 2. A split pin or the like 31A is used to prevent the loosening of each nut 31. A sealing ring 32 is located on top of the boss 28 and, when the tine mounting 27 is in its appointed position, the sealing ring 32 is clamped tightly between the boss 28 and the bottom of the lower bearing for the corresponding shaft 2, the ring 32 acting to prevent significant oil leakage from that bearing. The tine mounting 27 comprises support portions 33 and 34 whose longitudinal axes $a$ and $b$ (FIG. 5) are diametrically opposed when the assembly is viewed lengthwise (FIG. 6) of the longitudinal axis $h$ (axis of rotation) of the corresponding shaft 2. The axis $h$ is also the longitudinal axis of the internal bore 29 of the boss 28. As will be evident from FIG. 5 of the drawings, the support portions 33 and 34 are, actually, both downwardly inclined away from the ends thereof that are integral with the boss 28. An acute angle is thus enclosed between the axis $h$ and each of the axes $a$ and $b$. It will be remembered that the axis $h$ is vertically or substantially vertically disposed.

Each of the support portions 33 and 34 is provided, near the end thereof which is remote from the boss 28, with a corresponding tine holder 37 of generally cylindrical configuration, formed with a central bore 36 whose longitudinal axis $h'$ is parallel or substantially parallel to the axis $h$ of the internal bore 29 of the boss 28. The central bores 36 of the two tine holders 37 are constructed and arranged to receive the fastening portion of a corresponding rigid soil working tine 35. Each of the tines 35 has a lower active or soil working portion 45 and it will be noted that the axial length of each tine holder 37 is equal to substantially one-third of the length of one of the active or soil working portions 45. It will also be noted from FIG. 6 of the drawings that the longitudinal axis $h$ and the two longitudinal axes $h'$ are contained in a common substantially vertical plane B—B. The front of each of the support portions 33 and 34 with respect to the intended direction of rotation C (FIG. 6) of the corresponding soil working member 26A is provided with an integral screen 39 and, as viewed in FIG. 6 of the drawings, the front of each such screen 39 and the corresponding support portion 33 and 34 with respect to the direction C is inclined to the plane B—B. However, the rear of each of the support portions 33 and 34 with respect to the same direction C as seen in FIG. 6 of the drawings is substantially parallel to the plane B—B.

Figures 5, 6:
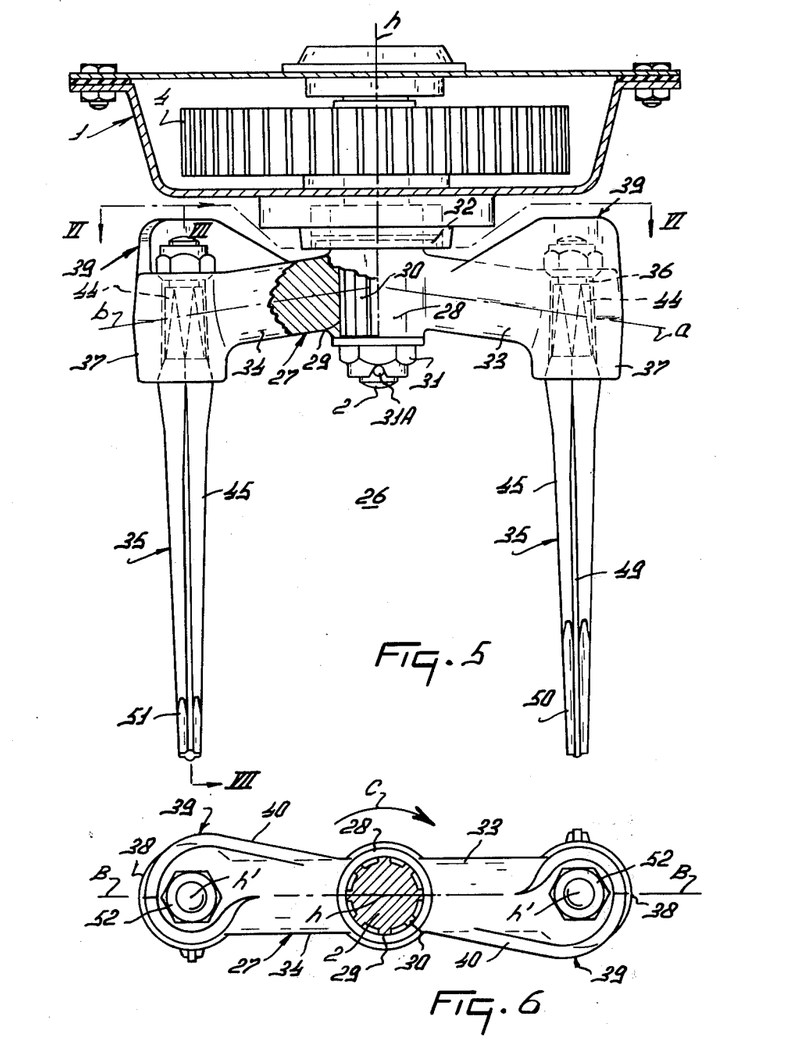
FIG. 5 is a further section taken on the line II—II in FIG. 1 but illustrates an alternative tine mounting in accordance with the invention.
FIG. 6 is a section taken on the line VI—VI in FIG. 5.
Figure 7:
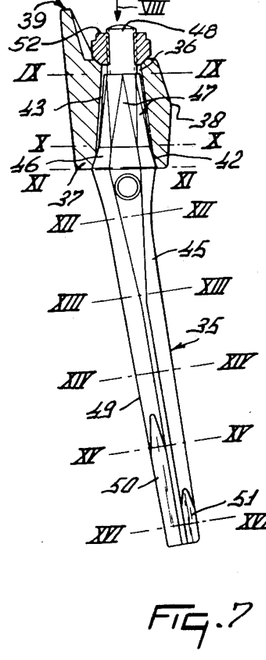
FIG. 7 is a section taken on the line VII—VII in FIG. 5.
Figure 8:
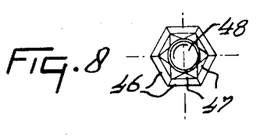
FIG. 8 is a plan view of the tine of FIG. 7 as seen in the direction indicated by an arrow VIII in FIG. 7, FIGS. 9 to 16 are sections of the tine of FIG. 7 taken on the lines IX—IX to XVI—XVI respectively, and, FIG. 17 is a second section taken on the line VI—IV in FIG. 5 but illustrates an alternative tine mounting in accordance with the invention.
Figure 9:
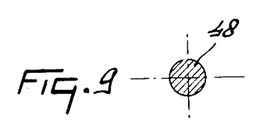

It will be seen from FIGS. 6 and 7 of the drawings that each of the tine holders 37 includes a thickened portion 38 whose maximum extent is at a level substantially midway between the top and the bottom of the holder 37 concerned. The thickened portions 38 extend partly around the tine holders 37 from their integral rear junctions (with respect to the direction C) with the corresponding support portions 33 and 34 towards the fronts of the holders 37 but are omitted in front regions of those holders (see FIG. 7). It can also be seen in FIGS. 5 to 7 of the drawings that the previously mentioned integral screens 39 are located principally, although not completely, at the front of the holders 37 with respect to the direction C and mainly above and in front of the mouths at the upper ends of the central bores 36 of the tine holders 37. Although each screen 39 tapers upwardly to some extent, at least its front with respect to the direction C is straight and substantially in line with the front of the corresponding holder 37 with respect to the same direction as seen in cross-section (see FIG. 7). This straight front that can be seen in FIG. 7 is inclined at a few degrees to the corresponding axis $h'$ in such a way that the uppermost end thereof is further advanced with respect to the direction C (FIG. 6) than is the lowermost end thereof. Each screen 39 has its maximum height in front of the upper mouth of the corresponding central bore 36, the region of maximum height having a substantially flat upper edge which is substantially perpendicular to the corresponding axis $h'$ (see FIG. 5) but each such region is flanked laterally by regions of decreasing height. At that side of the region of maximum height of each screen 39 which is closest to the boss 28, said screen affords a downwardly inclined rim 40, (FIG. 6), said rims 40 merging integrally into the fronts of the corresponding support portions 34 and 33 (with respect to the direction C) close to the boss 28. The opposite ends of the screens 39 extend steeply downwardly to merge into the top surfaces of the corresponding holders 37. Due to the slight forward inclination (FIG. 7) of each upwardly directed integral screen 39, significantly more of the metallic material of the whole tine mounting 27 is located in front, with respect to the direction C, of the plane B—B at each side of the axis $h$ than is disposed behind that plane. This relationship is particularly true in the regions of the two tine holders 37 so that the rigidity of the material is high in these regions with an advantageous effect upon the resistance to damage by stones and the like that may be met with during working of the soil by the tines 35.

Each tine mounting 27 is forged from a single piece of metallic material in such a way that the forging operation produces the screens 39 and also the bores 29 and 36. This method of manufacture makes it unnecessary to provide separate machining steps for the formation of the bores 29 and 36.

Each of the central bores 36 comprises a lower tapering part 42 and an upper tapering part 43 which adjoin one another but which are of different shapes and different lengths. The lower tapering part 42 is the shorter part and is the more steeply tapering and, due to its disposition at the lower end of the corresponding tine holder, 37, is the part which is nearest to the active or soil working portion 45 of the corresponding tine 35 when that tine is installed in its intended operative position. The lower tapering part 42 has an axial length which is substantially half that of the upper tapering part 43 and it will be seen from FIGS. 5 and 7 of the drawings that the axial length of the upper tapering part 43 is substantially half that of the bore 36 in the tine holder 37 with which it co-operates. The extreme upper end of the upper tapering part 43 terminates in an upwardly divergent mouth whose downwardly tapering frusto conical wall has a cone angle of substantially 90°, the apex of the imaginary cone being located on the axis $h'$ inside the central bore 36. The walls of the lower and upper tapering parts 42 and 43 are not of circular cross-section but are afforded by a plurality of flats. As will be seen in FIG. 10, in particular, of the drawings, there are six of the flats in the embodiment which is being described by way of example so that the cross-section is of regular hexagonal configuration. However, in the upper tapering part 43, there are two regular hexagonal cross-sections which are angularly offset from one another by 30° about the axis $h'$ and the effect is to produce twelve triangular flats six of which have their bases at the top of the part 43 and their apices at the junction of that part with the part 42 while the other six have their bases at the level of the junction between the parts 42 and 43 and their apices at the top of the part 43. The twelve triangles of these two different kinds are in alternate succession around the axis $h'$.

The central bores 36 of the tine holder 37 that are shaped in the manner described above receive fastening portions 44 of the corresponding tines 35. The fastening portion 44 of each tine 35 makes an integral junction with the active or soil working portion 45 thereof, both portions being substantially straight and their longitudinal axes being inclined to each other by an angle which is advantageously substantially 8° and which it is preferred should not be less than substantially 8°. A junction portion 46 which lies immediately above the integral connection between the fastening portion 44 and the active or soil working portion 45 is of regular hexagonal cross-section (see FIG. 11), said junction portion 46 being upwardly tapering to fit the lower tapering part 42 of the central bore 36. Each flat of the lower tapering part 42 is inclined to the axis $h'$ at an angle of substantially 150° and has an axial length which it is preferred should be substantially 15 millimeters. The junction portion 46 which fits in the lower tapering part 42 of the bore 36 is adjoined by an upper conical portion 47 whose shape exactly matches that of the upper tapering part 43 in which it is to fit and thus exhibits twelve relatively inclined triangular flats. The shapes of the portions 46 and 47 can be seen most clearly in FIG. 8 of the drawings. The upper conical portion 47 terminates in a screwthreaded end portion 48 (FIG. 9) that is of circular cross-section. The active or soil working portion 45 tapers downwardly away from the junction portion 46 and, while it is of regular hexagonal cross-section close to the junction portion 46, it progressively changes in cross-section as the distance from the junction portion 46 increases to assume a substantially rectangular cross-section at and beneath the level of FIG. 13 of the drawings. The active or soil working portion 45 is progressively flattened towards its lowermost free end or tip in such a way that the ratio between the lengths of perpendicular diameters between opposite corners of said portion, as seen in cross-section, is substantially 1 : 2 at and near said free end or tip (see FIG. 16 of the drawings).

Figure 11:
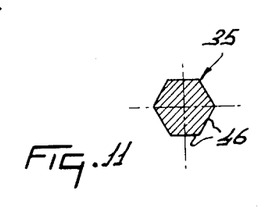
Figure 12:
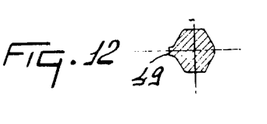
Figure 13:
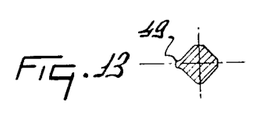
Figure 14:
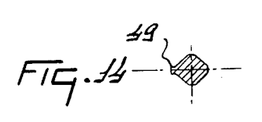
Figure 15:
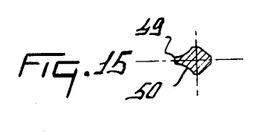

FIGS. 11 to 16 of the drawings show that the change from a regular hexagonal cross-section near the junction portion 46 to a substantially rectangular cross-section at and below the level of FIG. 13 is completed at a location substantially one-third of the way towards the lowermost free end or tip of the portion 45 from the level of FIG. 11 of the drawings. It can be seen from FIG. 12 that a rib 49 is formed at the leading corner (in cross-section) of the active or soil working portion 45 with respect to the direction C by flattening that corner and said rib 49 extends downwardly to the lower-most free end or tip (see also FIGS. 13 to 16). Leading hollow recesses or grooves 50 are formed in the what would otherwise be flat forwardly directed surfaces of the lower substantially rectangular cross-section region of the active or soil working portion 45 and, similarly, trailing hollow recesses or grooves 51 are formed in the corresponding pair of rearwardly directed surfaces thereof. It can be seen from FIGS. 7, 15 and 16 of the drawings that the upper ends of the recesses or grooves 50 and 51 become progressively shallower and vanish into the surfaces in which they are formed by way of points and it will be noted from the same Figures of the drawings that the leading recesses or grooves 50 extend upwardly from the lowermost free end or tip of the portion 45 throughout substantially one-third of the length of that portion while the trailing recesses or grooves 51 extend upwardly from said lowermost free end or tip throughout not more than substantially one-sixth of the length of said portion 45. FIGS. 12 to 16 of the drawings also show that, as seen in cross-section, the corner of the portion 45 which is opposite to the rib 49 is also flattened whereas, at and below the upper ends of the trailing hollow recesses or grooves 51, the other two corners (as seen in cross-section) are rounded off (see particularly FIG. 16 of the drawings). The leading hollow recesses or grooves 50 differ in depth to those of the trailing hollow recesses or grooves 51 to produce the cross-sectional shape at and near the free end or tip of the portion 45 which can be seen in FIG. 16 of the drawings, this shape being one which is advantageous in breaking up naturally hard or artificially compacted sub-soil.

The fastening portion 44 is firmly but releasably retained in the central bore 36 of the corresponding tine holder 37 by applying a fastening nut 52 to the screwthreaded portion 48 at the uppermost end of said portion 44. The lower end of the nut 52 has a downwardly tapering frusto conical surface which is arranged to co-operate centringly with the matchingly shaped mouth at the upper end of the bore 36. The junction portion 46 is tightly clamped in the lower tapering part 42 of the bore 36 and the flats formed on the portions 46 and 47 co-operate with those in the tapering lower and upper parts 43 of the bore 36 in preventing the tine 35 from turning about the axis h' of the central bore 36 when that tine is fixed in its appointed operative position.

The construction of the tine mounting 27 that has been described enables that mounting to be formed in a simple manner by forging, or by casting, the method of manufacture being one which does not require separate machining operations for the formation of the bores 29 and 36. The splines 30 in the internal bore 29 of the boss 28 enable the mountings 27 to be attached quickly to, or removed quickly from, the lowermost ends of the shafts 2 so that it is quite a quick and simple operation to substitute tine mountings of other shapes or tine mountings carrying alternative tines. The downward inclination of the support portions 33 and 34 from the boss 28 to the tine holders 37 ensures that, as can be seen in FIG. 5 of the drawings, a significant space is left between the bottom of the frame portion 1 and the top of the tine mounting 27 and this is conducive to pushing away any stones or the like that might otherwise tend to get trapped in this region during the operation of the harrow. As previously mentioned, the provision of the integral screens 39 has the result that more of the metallic material of each tine mounting 27 is located in front of the plane B—B (FIG. 6) with respect to the direction C at each side of the axis h (FIGS. 5 and 6) than there is behind that plane and this form of holder is particularly suitable for the cultivation of stony soil. The formation of the mounting 27 by forging, or by casting, has the additional advantage that the most suitable metallic material for that purpose can be employed bearing in mind that no welds or like metallic joints need be formed between different parts of the mounting 27.

Figure 10:
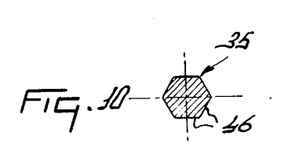

The tines 35 are also formed from metallic material by forging, or by casting, and the basically hexagonal cross-section thereof that extends from the level of FIG. 10 to the level of FIG. 13 of the drawings gives that region of the tine very high resistance to bending and breakage. The shape of the whole of the active or soil working portion 45, including the upper end thereof that is of basically hexagonal cross-section, is a shape which produces most effective displacement of the soil for harrowing and other cultivating purposes. The upper conical portion 47 of the fastening portion 44 of the tine 35 gives a gradual transition from the junction portion 46 that is of regular hexagonal cross-section to the upper screwthreaded portion 48 that is of circular cross-section. The strength, or at least the rigidity, of the active or soil working portion 45 of the tine 35 gradually decreases towards it lowermost free end or tip from the level of FIG. 11 of the drawings at which level said portion 35 integrally joins the junction portion 46.

Figures 16, 17:
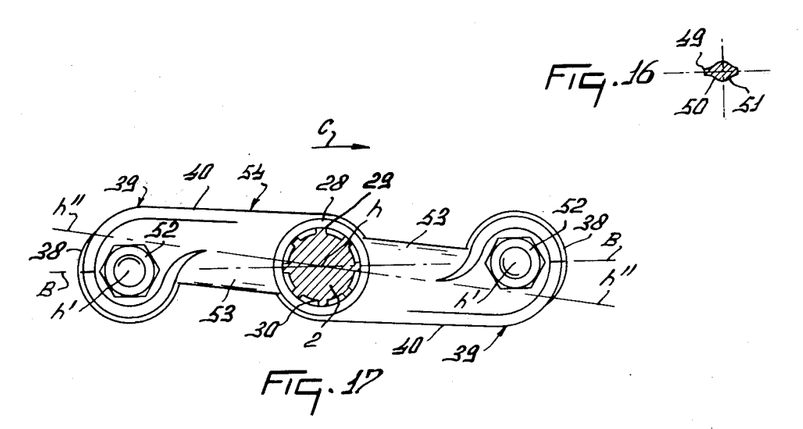

FIG. 17 of the drawings illustrates a tine mounting 54 which is similar in many respects to the tine mounting 27 that has been described above. However, in the embodiment of FIG. 17, support portions 53 that are located at diametrically opposite sides of the boss 28 are differently shaped and disposed to the support portions 33 and 34 of the mounting 27. As seen in FIG. 17 which corresponds to FIG. 6, the longitudinal axes h'' of said support portions 53 are inclined to the plane B—B. The front of each support portion 53 with respect to the intended direction of rotation C (FIG. 6) is contained in a flat plane, as seen in FIG. 17, that is substantially tangential to the other surface of the central boss 28, said plane also being inclined to the plane B—B. In this embodiment, the longitudinal axes h'' of the two support portions 53 are located at opposite sides of the plane B—B and, with respect to the direction C (FIG. 6), the central bores 36 of the tine holders 37 are disposed rearwardly of said axes h''. As seen in FIG. 17 of the drawings, the rear of each support portion 53 with respect to the direction C is also inclined to the plane B—B. As in the case of the tine mounting 27, the whole tine mounting 54 is made from a single piece of metallic material by forging or casting, the screens 39 being integral with the remainder of the mounting so that no separate machining operations are required for the formation of the bores 29 and 36. Once again, the provision of the integral screens 39 ensures that there is more of the metallic material of each support portion 63 of the mounting 54 in front of the plane B—B, with respect to the direction C, at each side of the axis h, than there is behind that plane with respect to the same direction. A very high resistance to damage by stones and other sharp objects that may be met with during operation of a harrow incorporating the mounting 54 of FIG. 17 is thus obtained.

Although various features of the tine mountings that have been described and/or that illustrated in the accompanying drawings will be set forth in the following claims as inventive features, it is emphasised that the invention is not necessarily limited to those features and that includes within its scope each of the parts of each tine mounting that has been described and/or that is illustrated in the accompanying drawings both individually and in various combinations.

I claim:

1. A tine mounting for a rotary harrow comprising an elongated support having at least one tine holder adjacent an end thereof and a bore that receives a driving shaft, said tine holder having an internal, substantially vertical bore that receives a fastening portion of a tine, the longitudinal axis of said vertical bore extending substantially parallel to the longitudinal axis of said first mentioned bore, said tine holder having a forward side with respect to the normal direction of rotation of said mounting, said support and said tine holder being integrally formed from a single piece of metal by forging or casting, and including an integral thickened wall located at the forward side of the tine holder, said wall merging into an upwardly extending screen that projects above and forwardly from said holder, said wall also being thicker at its outer lateral side, in a region between the top and bottom of said holder, than it is adjacent said top and bottom.

2. A tine mounting as claimed in claim 1, wherein said first-mentioned bore is formed in a substantially cylindrical boss.

3. A tine mounting as claimed in claim 2, wherein the front of said support, with respect to its direction of rotation, is in substantially tangential relationship with said boss.

4. A tine mounting as claimed in claim 2, wherein said boss is operatively connectable to said shaft with a ring being located on top of said boss which ring is clamped between said support, and a rotary support of said shaft.

5. A tine mounting as claimed in claim 1, wherein the height of said screen is at a maximum immediately in front of said vertical bore, and decreases at both opposite sides of that bore.

6. A tine mounting as claimed in claim 1, wherein said screen is inclined upwardly and forwardly away from the remainder of said support.

7. A tine mounting as claimed in claim 1, wherein said screen is formed integrally with the remainder of said support by forging or casting.

8. A tine mounting for a rotary harrow comprising an elongated support having at least one tine holder adjacent an end thereof and a bore that receives a driving shaft, said tine holder having an internal, substantially vertical bore that receives a fastening portion of a tine, the longitudinal axis of said vertical bore extending substantially parallel to the longitudinal axis of said first mentioned bore, said tine holder having a forward side with respect to the normal direction of rotation of said mounting, said support and said tine holder being integrally formed from a single piece of metal by forging or casting, and comprising an integral wall located at the forward side of said holder with respect to the normal direction of rotation, said wall tapering upwardly and increasing in thickness from the bottom thereof and merging into an upwardly extending screen that projects above and forwardly from said holder, said screen at its forward side having a flattened surface.

9. A tine mounting for a rotary harrow comprising an elongated substantially horizontal support having at least one tine holder adjacent an end thereof and a bore that receives a driving shaft, said tine holder having an internal, substantially vertical bore that receives a fastening portion of a tine, the longitudinal axis of said vertical bore extending substantially parallel to the longitudinal axis of said first mentioned bore, said tine holder having a forward side with respect to the normal direction of rotation of said mounting, said support and said tine holder being integrally formed from a single piece of metal by forging or casting, and including an integral wall located at the forward side of the tine holder, said wall tapering upwardly and increasing in thickness from the bottom thereof, said wall merging into an upwardly extending screen that projects above and forwardly from said holder, said screen having an upper rim that extends substantially parallel to said support and slopes downwardly towards said first mentioned bore.

10. A tine mounting for a rotary harrow comprising an elongated support having a tine holder at each lateral end and a central bore that receives a driving shaft, each tine holder having an internal substantially vertical bore that receives a fastening portion of a tine, the longitudinal axes of said vertical bores extending substantially parallel to the longitudinal axis of said central bore, each tine holder having a forward side with respect to the normal direction of rotation of said mounting, said support and said tine holder being integrally formed from a single piece of metal by forging or casting, and including an integral wall located at the forward side of each tine holder, said wall tapering upwardly and increasing in thickness from the bottom thereof, said wall merging into an upwardly extending screen that projects above and forwardly from said holder, said wall also having a portion at its outer lateral side, in a region between the top and bottom of that holder, that is thicker than said top and bottom of the holder.

11. A tine mounting as claimed in claim 10, wherein, as seen in plan view, said support is elongate in a direction transverse to its axis of rotation, each vertical bore being located behind the longitudinal axis of said support, as seen in plan view, and with respect to the direction of rotation.

12. A tine mounting as claimed in claim 10, wherein said first-mentioned bore is splined and said vertical bore is of polygonal cross-section, said mounting being forged or cast from a single piece of material.

13. A tine mounting as claimed in claim 10, wherein each holder is substantially cylindrical in configuration.

14. A tine mounting as claimed in claim 10, wherein said support is elongate as seen in plan view and its longitudinal axis is inclined to a plane containing the longitudinal axes of said vertical bores.

15. A mounting as claimed in claim 10, wherein each screen has an upper rim that extends substantially parallel to said support and the inner portion of said rim slopes downwardly towards said central bore.

* * * * *